US 6,556,751 B1

(54) APPARATUS FOR AND METHOD OF MEASURING OPTICAL ALIGNMENT OF FIBER BLOCK

(75) Inventors: Yong-Woo Lee, Seoul (KR); Woo-Hyuk Jang, Kyonggi-do (KR); Hyung-Jae Lee, Kyonggi-do (KR); Tae-Hyung Rhee, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/484,695

(22) Filed: Jan. 18, 2000

(30) Foreign Application Priority Data

Jan. 19, 1999 (KR) ............................................. 99-1462

(51) Int. Cl.$^7$ ................................................. G02B 6/26
(52) U.S. Cl. .............................. 385/50; 385/89; 385/22
(58) Field of Search ............................. 385/50, 49, 52, 385/88, 89, 90, 22

(56) References Cited

U.S. PATENT DOCUMENTS

| | | |
|---|---|---|
| 5,046,813 A | 9/1991 | Itoh et al. |
| 5,170,456 A | 12/1992 | Itoh et al. |
| 5,623,337 A | 4/1997 | Iori et al. |
| 5,677,973 A | 10/1997 | Yuhara et al. |
| 5,703,973 A | 12/1997 | Mettler et al. |
| 5,897,611 A | 4/1999 | Case et al. |
| 6,160,936 A | * 12/2000 | You et al. ...................... 385/49 |
| 6,181,856 B1 | * 1/2001 | Brun ............................ 385/52 |
| 6,278,814 B1 | * 8/2001 | Song et al. .................... 385/24 |

* cited by examiner

Primary Examiner—Frank G. Font
Assistant Examiner—Layla Lauchman
(74) Attorney, Agent, or Firm—Robert E. Bushnell, Esq.

(57) ABSTRACT

Disclosed are an apparatus for and a method of measuring optical alignment conditions of optical fibers mounted to a V-groove array in an optical fiber block connected to the input or output terminals of an optical waveguide device. The disclosed apparatus includes a light source, a measuring unit for measuring the characteristics of a light emitted from the light source and outputted from each of the optical fibers after passing through the optical fiber, and a control unit for determining respective central positions of the first and last ones of the optical fibers, based on the characteristics of the first and last optical fibers measured by the measuring unit, determining a direction connecting the determined central positions of the first and last optical fibers, and conducting a control for allowing the light emitted from the light source to be irradiated onto the remaining optical fibers in a sequential fashion along the determined direction, thereby allowing the measuring unit to measure the characteristics of the remaining optical fibers.

25 Claims, 2 Drawing Sheets

APPARATUS FOR AND METHOD OF MEASURING OPTICAL ALIGNMENT OF FIBER BLOCK

CLAIM OF PRIORITY

This application makes reference to, incorporates the same herein, and claims all benefits accruing under 35 U.S.C. §119 from my application APPARATUS FOR AND METHOD OF MEASURING OPTICAL ALIGNMENT OF FIBER BLOCK filed with the Korean Industrial Property Office on Jan. 19, 1999 and there duly assigned Ser. No. 1462/1999.

BACKGROUND OF THE INVENTION

1. Field of the Invention

The present invention relates to an apparatus for and a method of measuring an optical alignment of an optical fiber block, and more particularly to an apparatus for and a method of measuring optical alignment conditions of optical fibers mounted to a V-groove array in an optical fiber block connected to the input or output terminals of an optical waveguide device.

2. Description of the Prior Art

Generally, an increase in the number of input/output terminals in an optical waveguide device such as a 1×N splitter, wavelength division multiplexer/demultiplexer, or optical switch results in a difficulty in attaching an optical fiber block to the input or output terminals of the optical waveguide device. Of course, the space between adjacent ones of waveguides at the input or output terminals in such an optical waveguide device and the position of each waveguide on a substrate can have an accuracy of micron or less by virtue of an accurate photolithography. On the other hand, where optical fibers are attached to the input or output terminals of the optical waveguide device, it is required to arrange those optical fibers at desired positions, respectively. However, this process becomes more difficult as the number of the optical fibers used increases. To this end, it is necessary to use an optical fiber block in which optical fibers are accurately arranged in such a fashion that they are spaced apart from one another by a space corresponding to that of the optical waveguides at the input or output terminal of the optical waveguide device within an accuracy of micron or less.

However, such an optical fiber block has a structure fabricated by manually mounting single-core or multi-core optical fibers to a V-groove array. Due to such a structure, the optical fiber block may have a degraded reliability when it is attached to an optical waveguide device unless the alignment condition thereof is checked. In addition, there is a problem in that it is impossible to find an accurate alignment center of the optical fiber block. Therefore, it is necessary to provide an apparatus for and a method of measuring an optical alignment of the optical fiber block.

U.S. Pat. No. 5,703,973 for an Optical Integrated Circuit Having Passively Aligned Fibers And Method Using Same to Mettler et al discloses in FIG. 7 an apparatus for aligning optical fibers in an optical fiber array. Micropositioners are capable of finely positioning respective optical fiber arrays in three dimensions. A laser source is coupled to the ends of the optical fibers and can selectively generate laser light in any selected optical fiber. A light detector and a power meter generates a signal and intensity of laser light transmitted through the interconnection assembly. However, I have not seen a method for measuring the alignment of optical fibers in an optical fiber block that tests the first fiber on the edge of a block, the last fiber on the other edge of the block first before testing the optical fibers in between to achieve better measurement of alignment.

SUMMARY OF THE INVENTION

An object of the invention is to provide an apparatus for and a method of measuring an optical alignment of an optical fiber block, in which the optical alignment of the optical fiber block is measured by measuring the characteristics of the first and last ones of optical fibers mounted to a V-groove array in the optical fiber block, determining respective positions of those first and last optical fibers, and measuring the characteristics of the remaining optical fibers, based on the determined positions.

In accordance with one aspect, the present invention provides an apparatus for measuring optical alignment conditions of optical fibers mounted to an optical fiber block comprising: a light source; a measuring unit for measuring the characteristics of a light emitted from the light source and outputted from each of the optical fibers after passing through the optical fiber; and a control unit for determining respective central positions of the first and last ones of the optical fibers, based on the characteristics of the first and last optical fibers measured by the measuring unit, determining a direction connecting the determined central positions of the first and last optical fibers, and conducting a control for allowing the light emitted from the light source to be irradiated onto the remaining optical fibers in a sequential fashion along the determined direction, thereby allowing the measuring unit to measure the characteristics of the remaining optical fibers.

In accordance with another aspect, the present invention provides A method for measuring optical alignment conditions of optical fibers mounted to an optical fiber block comprising the steps of: irradiating a light emitted from a light source onto a first one of the optical fibers in the optical fiber block, and adjusting a central position of the first optical fiber in such a fashion that the light passing through the first optical fiber has a maximum power; irradiating the light emitted from a light source onto a last one of the optical fibers, and adjusting a central position of the last optical fiber in such a fashion that the light passing through the last optical fiber has a maximum power; and determining a direction connecting the adjusted central positions of the first and last optical fibers, and irradiating the light emitted from the light source onto the remaining optical fibers in the optical fiber block in a sequential fashion along the determined direction while measuring respective powers of lights outputted from the remaining optical fibers, thereby checking respective alignment conditions of the remaining optical fibers, and conducting a control for allowing the light emitted from the light source to be irradiated onto the remaining optical fibers, thereby allowing the measuring unit to measure the characteristics of the remaining optical fibers in the determined direction.

In accordance with another aspect, the present invention provides a method for measuring optical alignment conditions of optical fibers mounted to an optical fiber block comprising the steps of: irradiating a light emitted from a light source onto a first one of the optical fibers in the optical fiber block, and adjusting a central position of the first optical fiber in such a fashion that the light passing through the first optical fiber has a maximum power; irradiating the light emitted from a light source onto a last one of the optical fibers, and adjusting a central position of the last optical fiber in such a fashion that the light passing through the last optical fiber has a maximum power; and determining a direction connecting the adjusted central positions of the first and last optical fibers, and irradiating the light emitted from the light source onto the remaining optical fibers in the optical fiber block in a sequential fashion along the determined direction while measuring respective powers of lights outputted from the remaining optical fibers, thereby checking respective alignment conditions of the remaining optical fibers, and conducting a control for allowing the light emitted from the light source to be irradiated onto the remaining optical fibers, thereby allowing the measuring unit to measure the characteristics of the remaining optical fibers in the determined direction.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
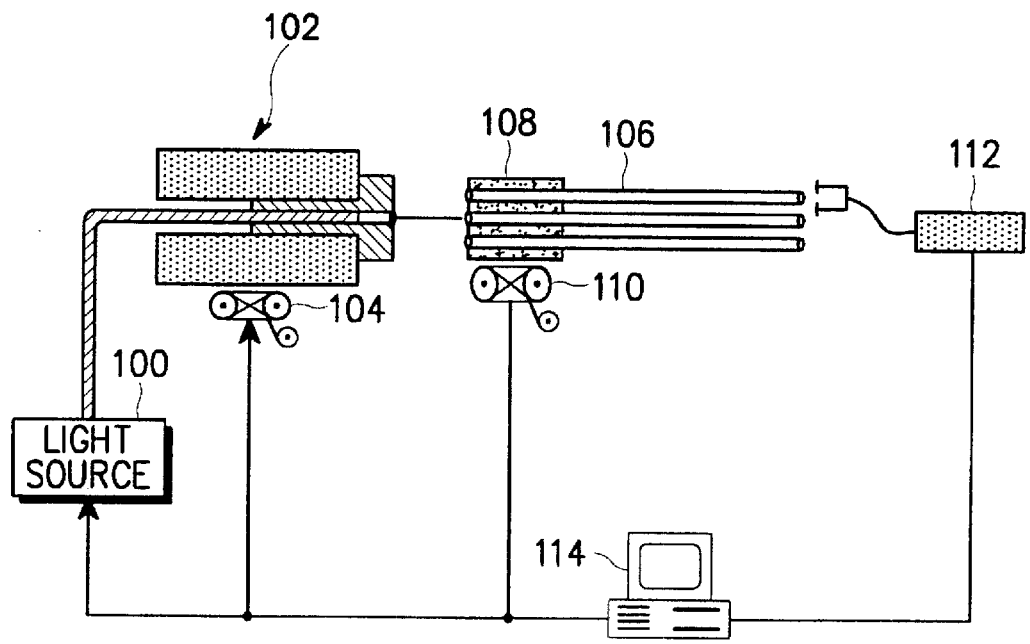
FIG. 1 is a block diagram illustrating an apparatus for measuring an optical alignment of an optical fiber block in accordance with the present invention.

FIG. 1 is a block diagram illustrating an apparatus for measuring an optical alignment of an optical fiber block in accordance with the present invention. As shown in FIG. 1, the measuring apparatus includes a light source 100, a light focusing unit 102, a first moving means 104, a V-groove array 108 mounted with a plurality of optical fibers 106, a second moving means 110, a measuring unit 112, and a control unit 114.

Figure 2:
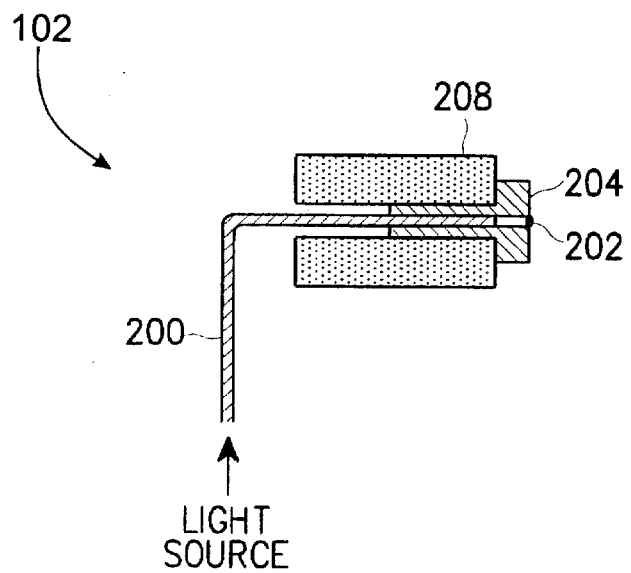
FIG. 2 is a cross-sectional view illustrating the configuration of a light focusing unit shown in FIG. 1.

The light focusing unit 102 serves to focus a light emitted from the light source 100. Referring to FIG. 2, the configuration of the light focusing unit 102 is illustrated. As shown in FIG. 2, the light focusing unit includes an optical fiber 200 for transmitting the light emitted from the light source 100, a focusing lens 202 for focusing the light transmitted from the transmitting optical fiber 200, a lens holder 204 having a through hole adapted to receive the focusing lens 202 at one end thereof to hold the focusing lens 202 while receiving an end of the transmitting optical fiber 200 at the other end thereof, and a support holder 208 for supporting the lens holder 204 along with the transmitting optical fiber 200 received in the lens holder 204.

The first moving means 104 serves to move the support holder 208 of the light focusing unit 102 under the control of the control unit 114 in order to allow the focused light to a selected one of the optical fibers 106. The second moving means 110 serves to move the V-groove array 108 under the control of the control unit 114.

The measuring unit 112 measures the powers of lights respectively transmitted from the optical fibers 106 mounted to the V-groove array 108 or measures the mode size or intensity of those lights. Where it is desired to measure the power of a light, an optical power meter may be appropriately used for the measuring unit 112. On the other hand, where it is desired to measure the mode size or intensity of a light, a charge coupled device (CCD) may be appropriately used for the measuring unit 112.

The control unit 114 serves to control the first and second moving means 104 and 110 in order to adjust respective positions of the light focusing unit 102 and V-groove array 108, thereby maximizing the power or intensity of the light measured by the measuring unit 112. The control unit 114 also controls the light inputting and outputting operations of the light source 100.

The V-groove array 108 mounted with the optical fibers 106 may be fabricated using a variety of fabrication methods. One fabrication method is to fabricate a V-groove array from a silicon wafer using a silicon oxide film depositing process, a photolithography process, a silicon nitride film depositing and dry etching process, and silicon wet etching process. Another fabrication method is to fabricate a V-groove array from a silicon wafer or borosilicate glass wafer by grinding is the wafer using a blade having an inclination of, for example, 60 at a uniform speed. In accordance with another fabrication method, the V-groove array may be molded using an appropriate mold.

Figure 3:
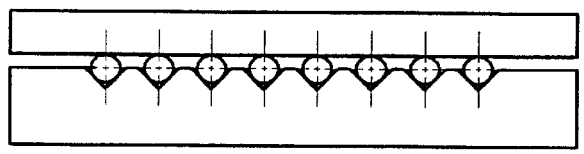
FIG. 3 is a view illustrating an end surface of the optical fiber block.

After the fabrication of the V-groove array, organic substances left on the surface of the V-groove array are removed using acetone. The surface of the V-groove array is then washed using distilled water. Thereafter, the V-groove array is dried, and then mounted to a jig so that it is fixed. Optical fibers, each of which is processed to remove a coating therefrom and to have a vertical end surface, are arranged on the V-groove array in an aligned fashion. The optical fibers arranged on the V-groove array in an aligned fashion are fixed using epoxy, and then covered with a glass plate in a pressed state. In this state, the epoxy is cured by ultraviolet rays irradiated thereto. The resultant structure is baked, and then polished. FIG. 3 illustrates the cross section of an optical fiber block fabricated in accordance with the above mentioned method.

Figure 4:
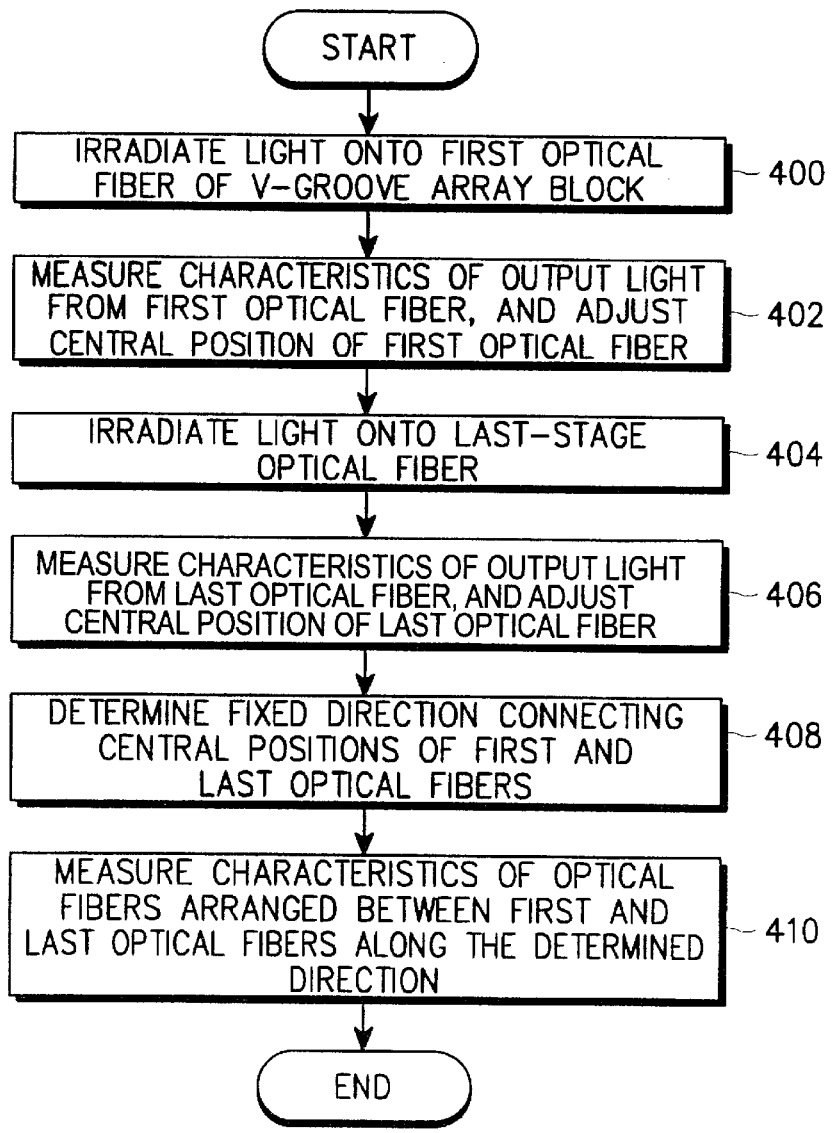
FIG. 4 is a flow chart illustrating a method for measuring an optical alignment of the optical fiber block in accordance with the present invention.

Now, a method for measuring an optical alignment of the optical fiber block having the above mentioned structure will be described in conjunction with FIG. 4. In accordance with this method, a light emitted from the light source 100 and focused by the light focusing unit 102 is irradiated onto a first one of the optical fibers 106 mounted to the V-groove array 108 (Step 400). Thereafter, the measuring unit 112 measures the power of a light outputted from the first optical fiber or measures the mode size or intensity of that light. Where each of the optical fibers is aligned with the center or a desired position of an associated one of the V-grooves in the V-groove array, the power or mode size of the light outputted from the first optical fiber is maximum. The optical mode has a Gaussian type intensity. The intensity of the optical mode is measured in the form of a 1/e or 1/e2 waveguide mode size.

However, where the first optical fiber is misaligned from the center or a desired position of an associated one of the V-grooves, the irradiated light is reflected by the end surface of the optical fiber or the end surface of the V-groove array 108, so that the amount of light measured by the measuring unit 112 is reduced. In this case, the control unit 114 controls the first moving means 104 or second moving means 110 in order to maximize the measured light power or to maximize the measured mode size or intensity. That is, the control unit 114 finely adjusts the position of the light focusing unit 102 or V-groove array 108 to adjust the central position of the first optical fiber by controlling the first moving means 104 or second moving means 110 (Step 402).

After the adjustment for the central position of the first optical fiber, the control unit 114 controls again the first moving means 104 or second moving means 110, thereby causing the light emerging from the light focusing unit 102 to be irradiated onto the last optical fiber (Step 404). The measuring unit 112 then measures the characteristics of the light outputted from the last optical fiber in the same fashion as in the case of the first optical fiber. Thereafter, the central position of the last optical fiber is finely adjusted to maximize the power or intensity of the output light (Step 406). Subsequently, a fixed direction connecting the central positions of the first and last optical fibers is determined (Step 408). A control is then conducted to move the first moving means 104 or second moving means 110 in the determined direction, thereby sequentially irradiating the light emerging from the light focusing unit 102 onto the optical fibers arranged between the first and last optical fibers. The measuring unit 112 then measures the characteristics of the lights respectively outputted from the optical fibers in a sequential fashion, thereby measuring alignment conditions of those optical fibers (Step 410).

As apparent from the above description, in accordance with the present invention, the characteristics of the first and last ones of optical fibers mounted to a V-groove array are measured to set the central positions of those optical fibers. Based on the set central positions of the first and last optical fibers, the characteristics of the remaining optical fibers are measured to measure an alignment of the V-groove array block. Thus, it is possible to accurately measure the optical-axis alignment of the V-groove array block. By virtue of the V-groove array block according to the present invention, it is possible to achieve a mass production of optical waveguide devices such as 1×N splitters or wavelength division multiplexers/demultiplexers while achieving an improvement in processing efficiency.

In accordance with the present invention, it is also possible to determine whether or not optical fiber blocks fabricated have errors because alignment errors of those optical fiber blocks can be checked.

While the present invention has been particularly shown and described with reference to a particular embodiment thereof, it will be understood by those skilled in the art that various changes in form and detail may be effected therein without departing away from the scope of the invention as defined by the appended claims.

What is claimed is:

1. An apparatus for measuring optical alignment conditions of a plurality of optical fibers mounted to an optical fiber block comprising:
   a light source;
   a measuring unit measuring the characteristics of a light emitted from the light source and outputted from each of the plurality of optical fibers after passing through respective ones of said plurality of optical fibers;
   a control unit automatically determining respective central positions of first and last ones of the plurality of optical fibers based on measurements received from said measuring unit; and
   a light focusing unit focusing the light emitted from the light source and irradiating the focused light onto selected ones of said plurality of optical fibers in the optical fiber block under a control of the control unit.

2. The apparatus in accordance with claim 1, wherein the measuring unit is an optical power meter for measuring the power of the light outputted from each of the optical fibers.

3. The apparatus in accordance with claim 1, wherein the measuring unit is a charge coupled device for measuring the mode size or intensity of the light outputted from each of the optical fibers.

4. A method for measuring optical alignment conditions of optical fibers mounted to an optical fiber block comprising the steps of:
   irradiating a light emitted from a light source onto a first one of the optical fibers in the optical fiber block, and adjusting a central position of the first optical fiber in such a fashion that the light passing through the first optical fiber has a maximum power;
   irradiating the light emitted from a light source onto a last one of the optical fibers, and adjusting a central position of the last optical fiber in such a fashion that the light passing through the last optical fiber has a maximum power; and
   determining a direction connecting the adjusted central positions of the first and last optical fibers, and irradiating the light emitted from the light source onto the remaining optical fibers in the optical fiber block in a sequential fashion along the determined direction while measuring respective powers of lights outputted from the remaining optical fibers, thereby checking respective alignment conditions of the remaining optical fibers, and conducting a control for allowing the light emitted from the light source to be irradiated onto the remaining optical fibers, thereby allowing the measuring unit to measure the characteristics of the remaining optical fibers in the determined direction.

5. A method for measuring optical alignment conditions of optical fibers mounted to an optical fiber block comprising the steps of:
   irradiating a light emitted from a light source onto a first one of the optical fibers in the optical fiber block, and adjusting a central position of the first optical fiber in such a fashion that the light passing through the first optical fiber has a maximum intensity;
   irradiating the light emitted from a light source onto a last one of the optical fibers, and adjusting a central position of the last optical fiber in such a fashion that the light passing through the last optical fiber has a maximum intensity; and
   determining a direction connecting the adjusted central positions of the first and last optical fibers, and irradiating the light emitted from the light source onto the remaining optical fibers in the optical fiber block in a sequential fashion along the determined direction while measuring respective intensities of lights outputted from the remaining optical fibers, thereby checking respective alignment conditions of the remaining optical fibers, and conducting a control for allowing the light emitted from the light source to be irradiated onto the remaining optical fibers, thereby allowing the measuring unit to measure the characteristics of the remaining optical fibers in the determined direction.

6. An apparatus for measuring optical alignment conditions of a plurality of optical fibers in an optical fiber block, comprising:
   a light source;
   a measuring unit for measuring the characteristics of a light emitted from said light source and outputted from each of the optical fibers after passing through the optical fiber;

a control unit for determining respective central positions of the first and last ones of the optical fibers, the first and the last optical fibers being optical fibers on an edge of said optical block, based on the characteristics of the first and last optical fibers measured by the measuring unit, determining a direction connecting the determined central positions of the first and last optical fibers, and conducting a control for allowing the light emitted from the light source to be irradiated onto the remaining optical fibers in a sequential fashion along the determined direction, thereby allowing the measuring unit to measure the characteristics of the remaining optical fibers;

a light focusing unit focusing light into a first end of one of said plurality of optical fibers; and a first moving means moving said light focusing unit between said first ends of said plurality of optical fibers.

7. The apparatus of claim 6, further comprising a second moving means moving said optical fiber block short distances allowing said light focusing unit to shine light between first ends of each of said plurality of optical fibers.

8. The apparatus of claim 7, said control unit moves said first moving means and said second moving means to allow light to be shined from said light focusing unit into said first end of each of said plurality of optical fibers in said optical fiber block.

9. The apparatus of claim 8, light emanating from a second end opposite said first end of said optical fibers is detected and analyzed.

10. The apparatus in accordance with claim 9, wherein the measuring unit is an optical power meter for measuring the power of the light outputted from each of the optical fibers.

11. The apparatus in accordance with claim 9, wherein the measuring unit is a charge coupled device for measuring the mode size or intensity of the light outputted from each of the optical fibers.

12. The apparatus of claim 1, further comprising a first moving unit moving said light focusing unit with respect to said optical fiber block, said first moving unit being controlled by said control unit.

13. The apparatus of claim 12, further comprising a second moving unit moving said optical fiber block with respect to said light focusing unit, said second moving unit being controlled by said control unit.

14. The apparatus of claim 1, said light focusing unit comprising:

a first end of a source optical fiber, the second and opposite end of said source optical fiber being connected to said light source; and a focusing lens attached to said first end of said source optical fiber focusing light emitted from said first end of said source optical fiber onto ones of said plurality of optical fibers in said optical fiber block.

15. The apparatus of claim 1, said measuring unit being a charge coupled device.

16. The apparatus of claim 1, said measuring unit being a power meter.

17. An apparatus for automatically measuring optical alignment conditions of a plurality of optical fibers in an optical fiber block, comprising:

a light source;

a measuring unit measuring the characteristics of a light emitted from said light source and transmitted through respected ones of said plurality of optical fibers;

a light focusing unit focusing light into a first end of one of said plurality of optical fibers;

a first moving unit moving said light focusing unit with respect to said optical fiber block; and a control unit connected to both said first moving unit and said measuring unit.

18. The apparatus of claim 17, said control unit automatically controlling said first moving unit based on measurements received from said measuring unit.

19. The apparatus of claim 17, further comprising a source optical fiber having a first end and a second end opposite said first end, said first end being attached to said light source and said second end being attached to said light focusing unit.

20. The apparatus of claim 18, said control unit serving to position said light focusing unit with respect to respective ones of said plurality of optical fibers in said optical fiber block to maximize transmission measurements received by said measuring unit.

21. The apparatus of claim 19, said control unit being connected to said light source to manage alignment between said source optical fiber and respective ones of said plurality of optical fibers in said optical fiber block.

22. The apparatus of claim 17, said measuring unit being a charge coupled device.

23. The apparatus of claim 22, said measuring unit measuring mode size of light transmitted through one of said plurality of optical fibers in said optical fiber block and relaying said measurements to said control unit to control said first moving unit to optimize transmission measurements received by said measuring unit.

24. The apparatus of claim 18, said control unit aligning said light source with first and last optical fibers in said optical fiber block before aligning fibers in between said first and last fibers in said optical fiber block.

25. The apparatus of claim 17, said light focusing unit comprising:

a first end of a source optical fiber, the second and opposite end of said source optical fiber being connected to said light source; and a focusing lens attached to said first end of said source optical fiber focusing light emitted from said first end of said source optical fiber onto ones of said plurality of optical fibers in said optical fiber block.

* * * * *